June 10, 1930.  E. W. SCHELLENTRAGER  1,762,196
AUTOMATIC RECORDING MEANS FOR DUMP CARS
Filed March 7, 1927  2 Sheets-Sheet 1
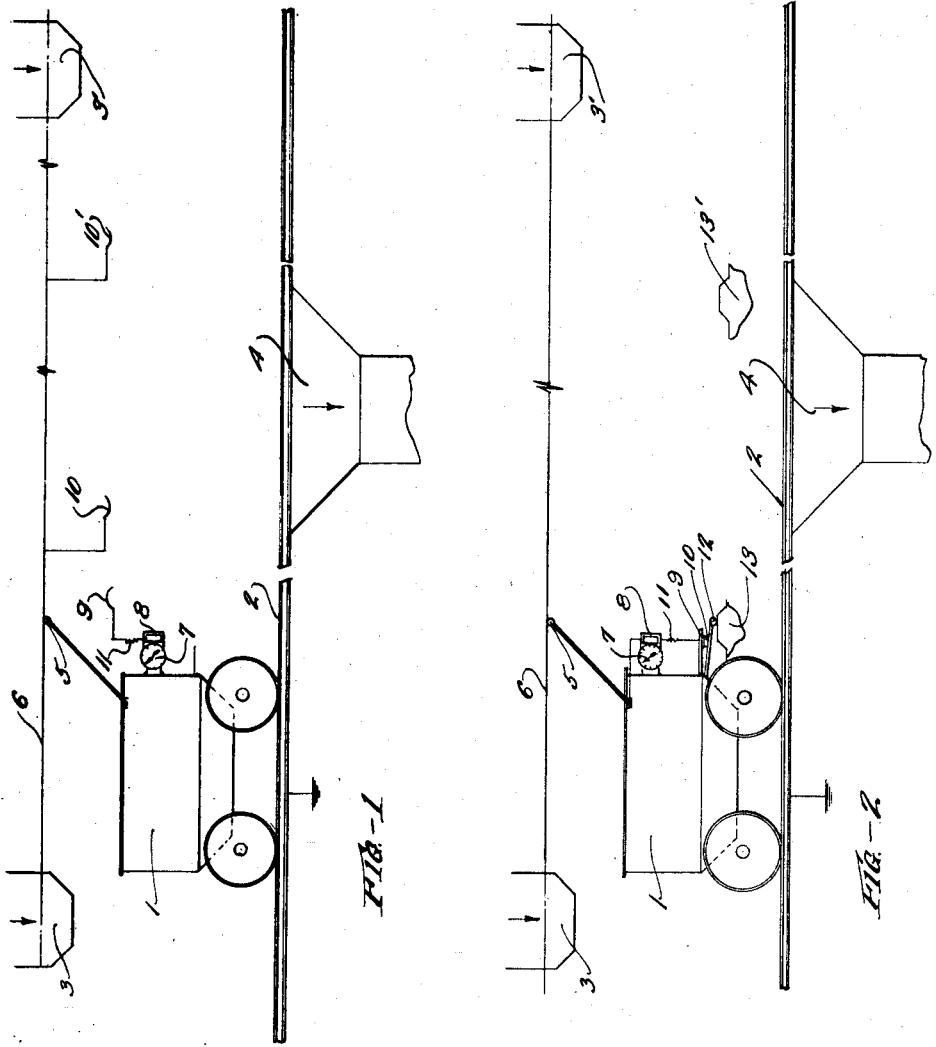
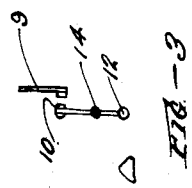
Inventor
Eugene W. Schellentrager
By Brockett + Hyde,
Attorney

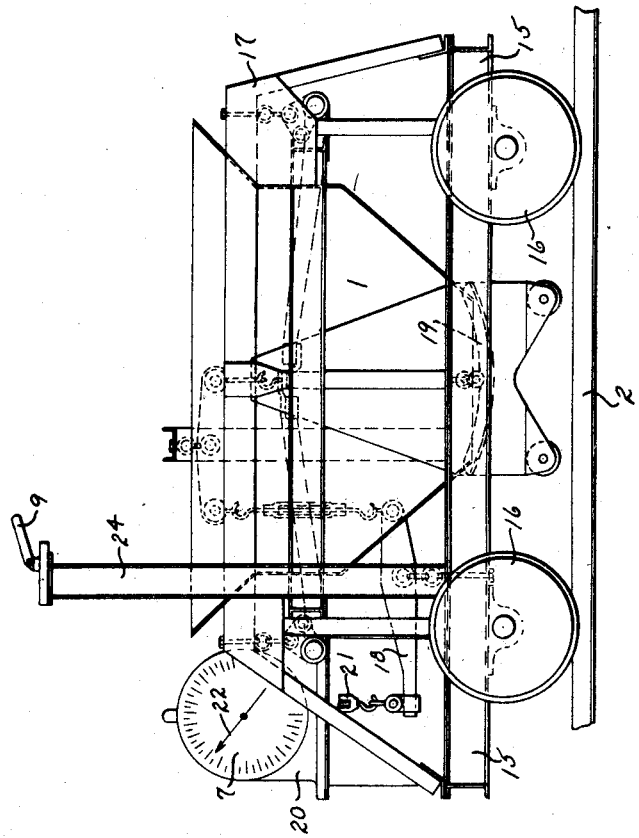
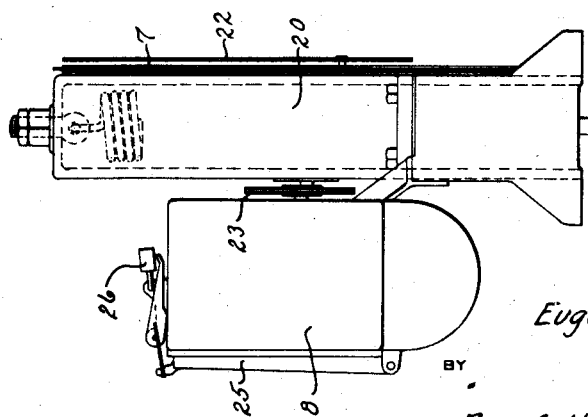

Patented June 10, 1930

1,762,196

UNITED STATES PATENT OFFICE

EUGENE W. SCHELLENTRAGER, OF CLEVELAND HEIGHTS, OHIO, ASSIGNOR TO THE ATLAS BOLT & SCREW COMPANY, OF CLEVELAND, OHIO, A CORPORATION OF OHIO

AUTOMATIC RECORDING MEANS FOR DUMP CARS

Application filed March 7, 1927. Serial No. 173,554.

This invention relates to industrial dump scale cars and has particular reference to means for recording the load weight in such cars automatically and without interfering with the load conveying cycle thereof. Further objects of my invention and advantages arising therefrom will be apparent from the following description taken in connection with the drawings in which Figs. 1 and 2 are applications of my invention, somewhat diagrammatically disclosed, and Fig. 3 is a detail of an alternate form of contactor employed therein. Fig. 4 is a view in side elevation of a car showing its pertinent structure so far as this invention is concerned, and Fig. 5 is an enlarged view showing the recording device secured to the weighing indicator which latter appears in Fig. 4. Referring now particularly to Fig. 1, 1 is the hopper of a dump scale car arranged for movement upon ways as the tracks 2 between loading positions beneath the bin mouths 3, 3' and a dumping position over the mouth 4 of a chute. The car is provided with actuating means not specifically shown but which may comprise an actuating motor supplied through a trolley 5 riding upon the trolley wire 6 and controlled by an operator upon the car, an operator alongside the track or automatically, all such arrangements being old and well known in the art. The car is provided with weighing scales in connection with the dial or "scale" 7 indicating at all times the weight of the contents of the car hopper. In connection with the scale is a recording device 8, the recording device being arranged for electrical actuation to record the instant indication of the scale 7 and these devices may be of the type set forth in my copending applications Serial No. 96,212, filed March 20, 1926 and Serial No. 96,213, filed March 20, 1926.

For actuation of the recording device I arrange contactors 9 and 10 carried respectively by the car and in connection with the trolley wire, the contactors being adapted for cooperation to complete the recorder actuating circuit as the car passes between loading and dumping positions; a resistance 11 being included in the circuit to prevent short circuiting of the main motor circuit, both of these circuits being completed through the ground as indicated. Where more than one loading position is employed as in connection with the bin mouth 3' corresponding contactors 10' may be employed. Operation of the device will be as follows: Assuming the car in loading position beneath the pin mouth 3, the car being loaded and moving to the dumping position above the chute 4, the contactor 9 wipes contactor 10 to effect a record of the weight of the load being conveyed. After dumping, the car being returned to loading position, the contactors will again effect a record which should be zero, indicating that the car was completely emptied of its load. Where the car is only partially loaded from the bin mouth 3 and thereafter the load completed from the bin mouth 3', in passing from the first to the second loading position two records will be made, contacts 10 and 10' functioning for this purpose, one of the records serving as a check upon the other. Thereafter in passing from the second loading position to the dumping position, an additional record will be effected by functioning of the contactor 10', this being an indication of the total load thereafter dumped. Similarly any desired number of loading or unloading positions may be accommodated and a complete record of the car movements and loads obtained.

Arrangement of Fig. 2 is generally similar, the principal parts being designated by corresponding numerals, the difference being that instead of actual contact being made between contactors stationary and on the car respectively, switch members 9, 10 are arranged upon the car, one of the members being actuable by a follower 12 cooperable with the cams 13, 13' arranged alongside the car way. The basic principle in functioning of this arrangement is obviously similar to that of the arrangement of Fig. 1. In some cases it may be desirable to record the scale reading during movement of the car in but one direction, in which case the alternate arrangement of contactors as indicated in Fig. 3 may be employed. Here the arm 12, pivotally mounted upon the car at 14, will be moved by the cam 13 regardless of direction of travel of the car, but contact will be made between the switch members 9 and 10 only as the car moves to the right in the figure.

With reference now to Fig. 4 the dump car of which 1 is the hopper having a swinging dumping gate 19, comprises a base 15 carried by wheels 16 running on rails 2. The hopper 1 is mounted on the base 15 in suspended relation thereto by means of a frame 17 and the scale levers and links indicated in dot-dash lines and including the lever 18. Upon the car is mounted a weighing device 20 associated with the weighing mechanism and particularly with the beam 18 by link means 21. The weighing device is shown with a dial 7 over which the pointer 22 moves. The arrangement is such that the weighing device cooperates with the weighing mechanism to determine the weight of load within the hopper 1 of the car.

With reference now to Fig. 5 the recording device 8 is associated with the weighing device 20 and interconnected therewith by means 23 whereby upon actuation of the recording device the instant load in the hopper 1, and measured by the weighing device 20, will be recorded. The car is provided with a trolley pole 24 carrying particularly the contactor 9 which is electrically associated with the recording device 8 as indicated Figs. 1 and 2 whereby the actuation of the recording device to make an instant record is controlled by the described circuit through the contactor 9. The recording device is provided with a closure 25 which may be sealed or locked as indicated by the padlock 26 to prevent unauthorized access to the record but allow authorized removal thereof.

What I claim is:

1. In combination with a dump scale car arranged for movement along a way between loading and dumping positions and provided with means for weighing the load therein and for recording said weight, and parts arranged on said car and said way respectively for cooperating during car movement past a predetermined point to cause said recording means to record the instant load in said car at said point.

2. In combination with a dump scale car arranged for movement along a way between loading and dumping positions and provided with means for weighing the load therein and for recording said weight, means for causing said recording means during said car movement to record the instant load therein, said means comprising members mounted on said car and alongside said way respectively, and cooperable to actuate said recording means.

3. In combination with a dump scale car arranged for movement along a way between loading and dumping positions and provided with means for weighing the load therein and for instantaneously recording said weight, means for causing said recording means during said car movement in one direction only, to record the instant load therein, said means comprising members mounted on said car and alongside said way respectively and cooperable, during car movement in said direction, to affect an actuating circuit for said recording means.

4. In combination with a dump scale car arranged for movement along a way between loading and dumping positions and provided with means for weighing the load therein and for instantaneously recording said weight, means for causing said recording means during said car movement, to record instant load therein, said means comprising a cam alongside said way and a member mounted on said car and adapted to be moved by said cam to affect an actuating circuit for said recording means.

In testimony whereof I hereby affix my signature.

EUGENE W. SCHELLENTRAGER.